(12) United States Patent
Jeng

(10) Patent No.: US 12,373,491 B2
(45) Date of Patent: Jul. 29, 2025

(54) SYSTEM AND METHOD FOR DISTRIBUTING INDEX MESSAGES IN A SHARD-AWARE INDEX PIPELINE

(71) Applicant: Walmart Apollo, LLC, Bentonville, AR (US)

(72) Inventor: Menkae Jeng, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 18/534,160

(22) Filed: Dec. 8, 2023

(65) Prior Publication Data

US 2025/0190491 A1   Jun. 12, 2025

(51) Int. Cl.
*G06F 7/00* (2006.01)
*G06F 9/50* (2006.01)
*G06F 16/901* (2019.01)

(52) U.S. Cl.
CPC ........ *G06F 16/9014* (2019.01); *G06F 9/5072* (2013.01)

(58) Field of Classification Search
CPC ............................ G06F 16/9014; G06F 9/5072
USPC .................................................. 707/600–899
See application file for complete search history.

(56) References Cited

U.S. PATENT DOCUMENTS

| | | | |
|---|---|---|---|
| 10,078,676 B2 | 9/2018 | Bhagat et al. | |
| 11,334,548 B2 | 5/2022 | Kuimelis et al. | |
| 2014/0372702 A1 | 12/2014 | Subramanyam et al. | |
| 2016/0292171 A1 | 10/2016 | Bhagat et al. | |
| 2023/0061102 A1* | 3/2023 | Su | G06F 16/2255 |

OTHER PUBLICATIONS

Saley, S., et al., "Building Faster Indexing with Apache Kafka and Elasticsearch," DoorDash Engineering Blog, retrieved Sep. 19, 2023 from https://doordash.engineering/2021/07/14/open-source-search-indexing Jul. 14, 2021.

Katwal, B., "Design a Robust Solr Data Indexing Pipeline and Solr Cloud Setup Best Practices," retrieved Sep. 19, 2023 from https://bikas-katwal.medium.com/design-a-robust-solr-data-indexing-pipeline-and-solr-cloud-setup-best-practices-7a42955d0599 Feb. 25, 2020.

(Continued)

*Primary Examiner* — Isaac M Woo
(74) *Attorney, Agent, or Firm* — Dickinson Wright PLLC; Hector A. Agdeppa

(57) ABSTRACT

A method can include determining a common mapping scheme for message queues and shards for an index message to be committed to the shards. The common mapping scheme can include a respective shard hash range for each shard, and a mapping function between the message queues and the shards. The method further can include determining a message hash value for the index message. Additionally, the method can include determining a target shard based on the message hash value and the respective shard hash range for each shard. The method also can include determining an intermediate message queue based on the message hash value and the mapping function. Moreover, the method can include storing the index message to the intermediate message queue. The method further can include causing the index message stored in the intermediate message queue to be committed to the target shard. Other embodiments are disclosed.

20 Claims, 7 Drawing Sheets

(56) References Cited

OTHER PUBLICATIONS

Jeng, M., "Improve Apache Solr Indexing Performance with Solr Shard Aware Data Partitioning" Nov. 2, 2022.
Apache Solr Reference Guide—Solr Cloud Shards and Indexing, Retrieved from solr-apache.org/guide/solr/latest/deployment-guide/solrcloud-shards-indexing.html on Sep. 7, 2024, 6 pages.
Gueriot, A., 6 Tips to Speed up your Solr Indexing Jobs, CRM and CX Blogs by SAP, retrieved from https://community.sap.com/t5/crm-and-cx-blogs-by-sap/6-tips-to-speed-up-your-solr-indexing-jobs/ba-p/13522880 on Sep. 7, 2024 Jun. 20, 2022.
Packt, Challenges of large-scale indexing, Retrieved from https://subscription.packtpub.com/book/data/9781783981847/1/ch01lvl1sec14/challenges-of-large-scale-indexing on Sep. 7, 2024.
Iqbal, N., Solr: Improving performance for Batch Indexing, Box Blogs, Retrieved from https://blog.box.com/solr-improving-performance-batch-indexing on Sep. 7, 2024, 7 pages May 30, 2018.
Kafka, Mirroring data between clusters & Geo-replication, Retrieved from https://kafka.apache.org/documentation/#bsic_ops_mirror_maker on Sep. 7, 2024.

\* cited by examiner

400

410 Determining a common mapping scheme for a plurality of message queues and a plurality of shards > 4110 Determining a mapping function 420 Generating the index message for an item in a data source 430 Determining a message hash value for the index message 440 Determining a target shard of the plurality of shards 450 Determining an intermediate message queue of the plurality of message queues 460 Storing the index message to the intermediate message queue 470 Causing the index message stored in the intermediate message queue to be committed to the target shard

510 Determining a least common multiple ($LCM$) of a shard count ($C_S$) and the queue count ($C_Q$)

520 Determining a sub-shard count ($C_{SS}$) for each of the plurality of shards 5210 Dividing the $LCM$ by $C_S$ 530 Determining one or more respective sub-shard hash ranges for the respective shard hash range for each of the plurality of shards 540 Determining a sub-queue count ($C_{QS}$) for each of the plurality of message queues 5410 Dividing the $LCM$ by $C_Q$ 550 Determining one or more respective sub-queue hash ranges for a respective queue hash range for each of the plurality of message queues 560 Determining a bijective function between: (a) each sub-shard and (b) a paired sub-queue

| Shard # | Hash Range | Sub-Shard # | Hash Range | Sub-Queue # | Queue # |
|---|---|---|---|---|---|
| 0 | 80000000 – 9998FFFF | 0 | 80000000 – 88885554 | 0 | 0 |
| | | 1 | 88885555 – 9110AAA9 | 1 | |
| | | 2 | 9110AAAA – 9998FFFF | 2 | 1 |
| 1 | 99990000 – B332FFFF | 3 | 99990000 – A221AAA9 | 3 | |
| | | 4 | A221AAAA – AAAA5554 | 4 | 2 |
| | | 5 | AAAA5554 – B332FFFF | 5 | |
| 2 | B3330000 – CCCBFFFF | 6 | B3330000 – BBBB5554 | 6 | 3 |
| | | 7 | BBBB5555 – C443AAA9 | 7 | |
| | | 8 | C443AAAA – CCCBFFFF | 8 | 4 |
| 3 | CCCC0000 – E665FFFF | 9 | CCCC0000 – D554AAA9 | 9 | |
| | | 10 | D554AAAA – DDDD5554 | 10 | 5 |
| | | 11 | DDDD5555 – E665FFFF | 11 | |
| ... | ... | ... | ... | ... | ... |
| 8 | 4CCC0000 – 6665FFFF | 24 | 4CCC0000 – 5554AAA9 | 24 | 12 |
| | | 25 | 5554AAAA – 5DDD5554 | 25 | |
| | | 26 | 5DDD5555 – 6665FFFF | 26 | 13 |
| 9 | 66660000 – 7FFFFFFF | 27 | 66660000 – 6EEEAAA9 | 27 | |
| | | 28 | 6EEEAAAA – 77775554 | 28 | 14 |
| | | 29 | 77775555 – 7FFFFFFF | 29 | |

710 Determining one of the plurality of update modules associated with an intermediate message queue, based on a queue count ($C_Q$) for a plurality of message queues and a updater count ($C_U$) for a plurality of update modules

720 Causing the one of the plurality of update modules to: (a) read, from the intermediate message queue, one or more queued index messages, and (b) commit the batch of the one or more queued index messages, as read, to the target shard(s) associated with the one or more queued index messages.

FIG. 7

SYSTEM AND METHOD FOR DISTRIBUTING INDEX MESSAGES IN A SHARD-AWARE INDEX PIPELINE

TECHNICAL FIELD

This disclosure relates generally to techniques for an improved distribution of index messages in an index pipeline with message queues corresponding to index shards for storing the index messages.

BACKGROUND

Conventional index pipelines distribute index messages randomly among message queues and use multiple updaters to send the index messages in the message queues to their corresponding shards in parallel. However, because each message queue can contain index messages to any shard, each updater may send the index messages to all of the shards. As a result, index updates by multiple updaters can be blocked if any shard is in a commit phase and does not process index updates. Further, if any of the shards is slower than others, the overall throughput can be adversely impacted. Thus, systems and methods for determining shard-aware data partitions in an index pipeline to reduce the delay or blocking in updates during index updates to the shards are desired.

BRIEF DESCRIPTION OF THE DRAWINGS

To facilitate further description of the embodiments, the following drawings are provided in which:

FIG. 4 illustrates a flow chart for a method for distributing index messages in an exemplary index pipeline for shards, according to an embodiment;

FIG. 5 illustrates a flow chart for a method for determining a common mapping scheme for message queues and shards for a search index, according to an embodiment;

FIG. 6 illustrates an exemplary table for a common mapping scheme, according to an embodiment; and FIG. 7 illustrates a flow chart for a method for causing an index message stored in an intermediate message queue to be committed to a target shard, according to an embodiment.

Figure 1:
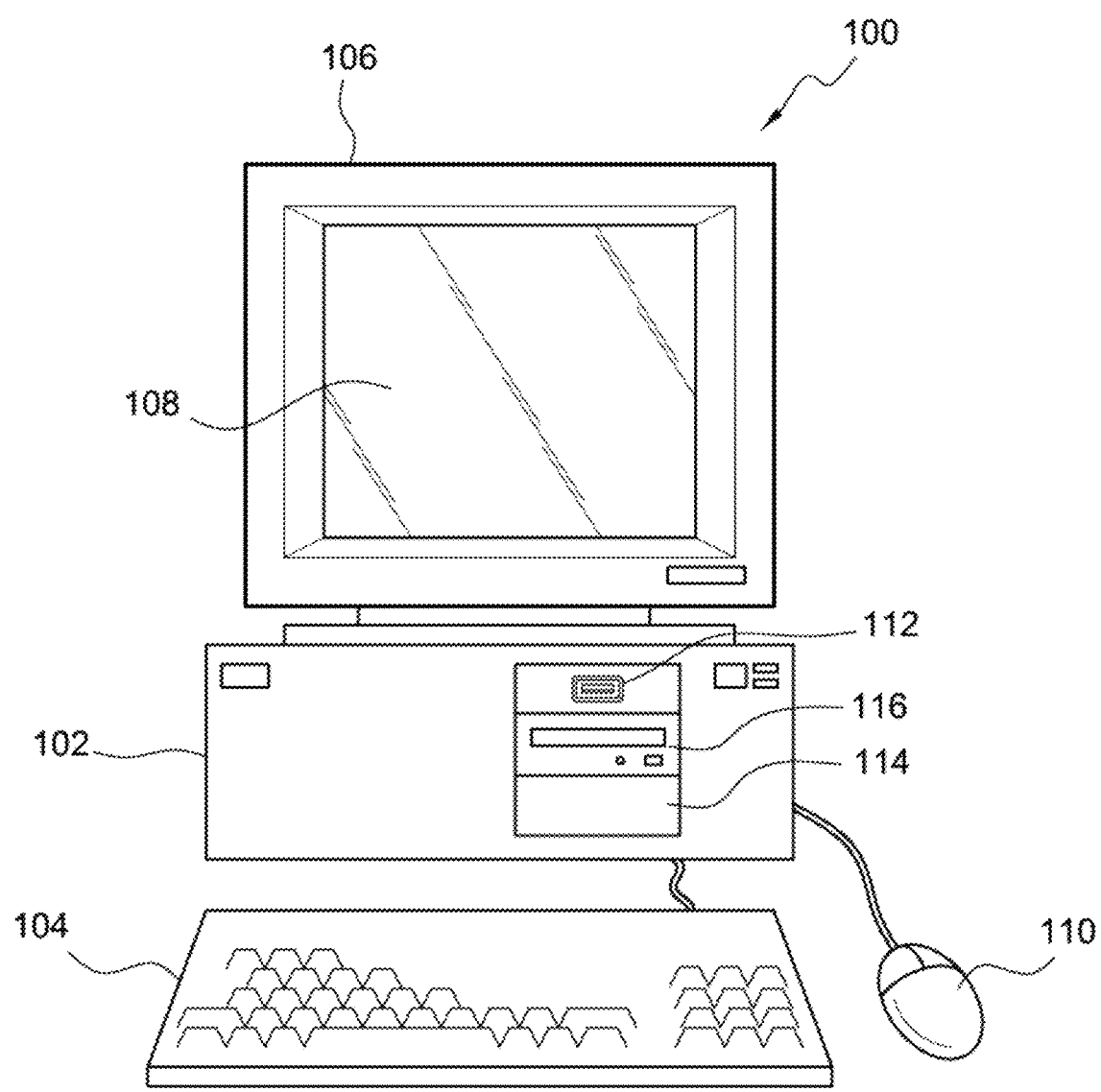
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
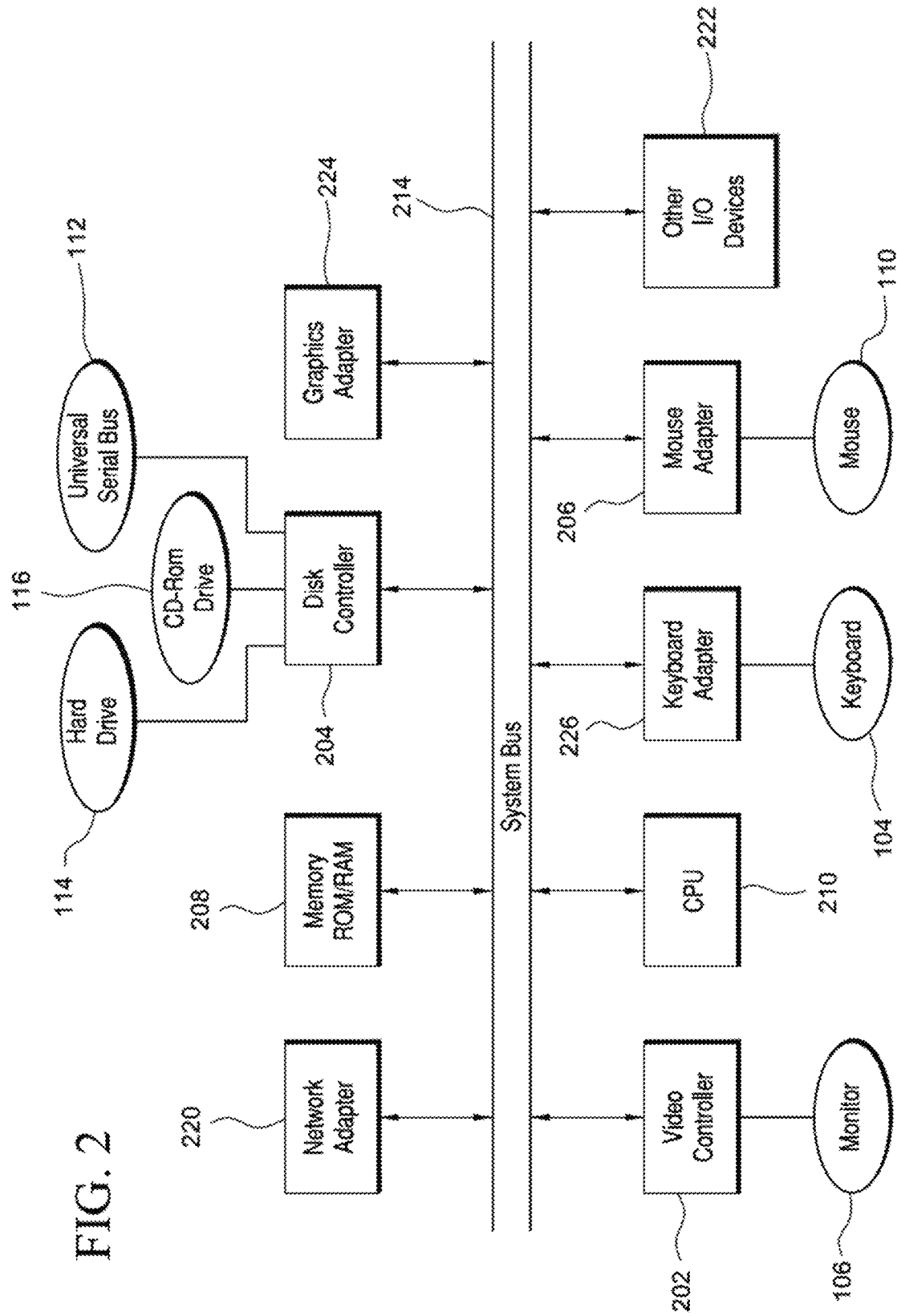
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICS.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
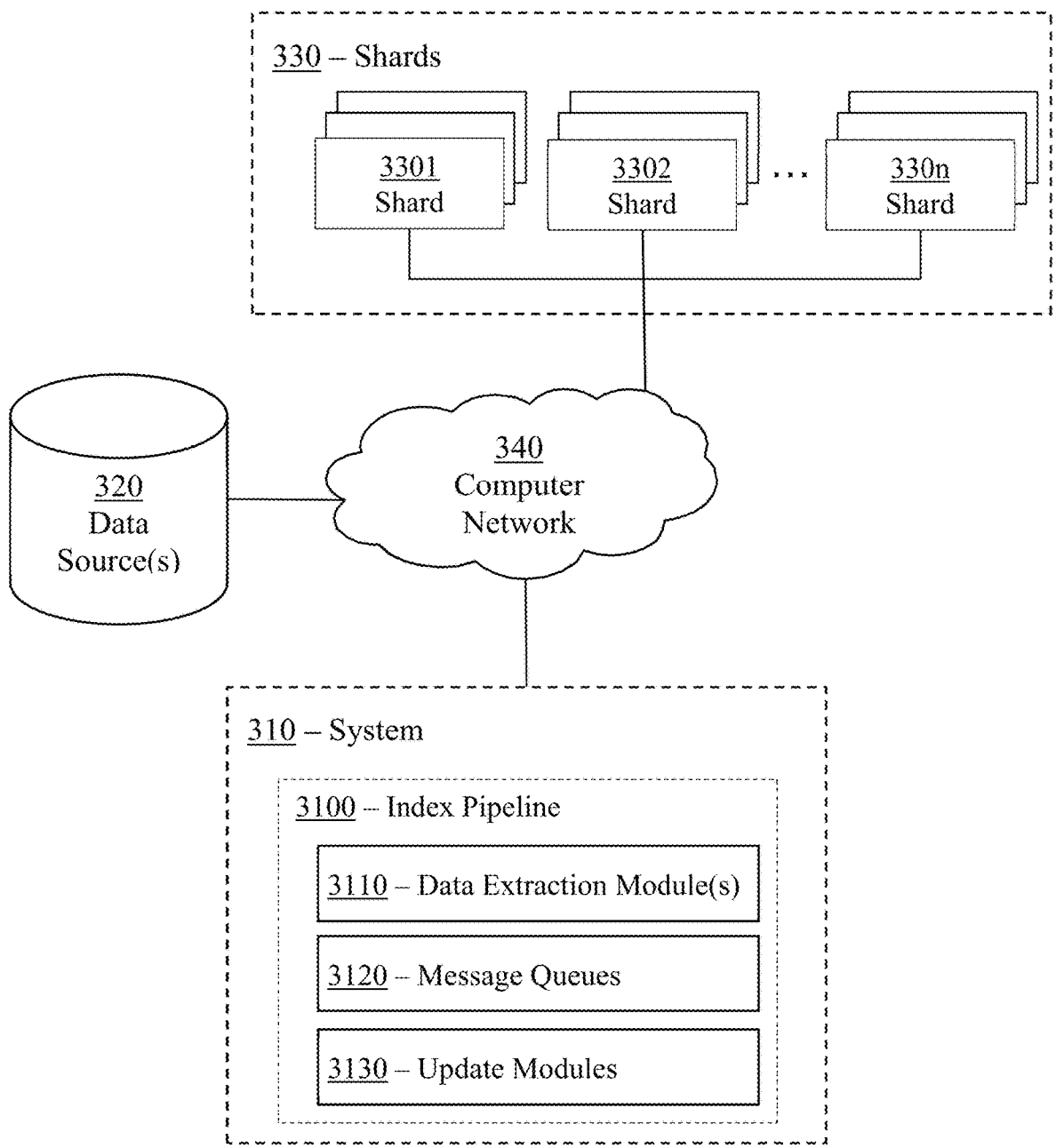
FIG. 3 illustrates a system for distributing index messages in an exemplary index pipeline for shards, according to an embodiment.

Turning ahead in the drawings, FIG. 3 illustrates a block diagram for a system 300 for distributing index messages in an index pipeline for shards, according to an embodiment. In many embodiments, system 300 can comprise one or more systems (e.g., a system 310). Systems 300 and 310, and their respective components, are merely exemplary. Embodiments of systems 300 and 310 are not limited to the embodiments presented herein, and systems 300 and 310 can be employed in many different embodiments or examples not specifically depicted or described herein.

Systems 300 and 310 can comprise one or more suitable systems, subsystems, servers, modules, elements, and/or models. In many embodiments, system 300 or system 310 can include one or more data sources (e.g., data source(s) 320), one or more shards (e.g., shards 330, a shard 3301, a shard 3302, a shard 330n, etc.), and/or one or more computer networks (e.g., a computer network 340). In a number of embodiments, system 300 or system 310 further can include one or more index pipelines (e.g., an index pipeline 3100) that each can include one or more data extraction modules (e.g., data extraction module(s) 3110), one or more message queues (e.g., message queues 3120), and/or one or more update modules (e.g., update modules 3130).

In many embodiments, certain elements, modules, servers, or systems of systems 300 and 310 can perform various procedures, processes, and/or activities. In other embodiments, the procedures, processes, and/or activities can be performed by other suitable elements, modules, servers, or systems of systems 300 and 310. Systems 300 and 310 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of systems 300 and 310 described herein.

Still referring to FIG. 3, in a number of embodiments, system 310, index pipeline 3100, data extraction module(s) 3110, message queues 3120, and/or update modules 3130 can each be a computer system, such as computer system 100 (FIG. 1), as described above, and can each be a single computer, a single server, or a cluster or collection of computers or servers. In other embodiments, a single computer system can host one or more of system 310, index pipeline 3100, data extraction module(s) 3110, message queues 3120, and/or update modules 3130. In some embodiments, system 310, index pipeline 3100, data extraction module(s) 3110, message queues 3120, and/or update modules 3130 can be modules of computing instructions (e.g., software modules) stored at non-transitory computer readable media that operate on one or more processors. Additional details regarding system 310, index pipeline 3100, data extraction module(s) 3110, message queues 3120, and/or update modules 3130 are described herein.

In a few embodiments, system 310 does not include index pipeline 3100, data extraction module(s) 3110, message queues 3120, and/or update modules 3130. As an example, index pipeline 3100, data extraction module(s) 3110, message queues 3120, and/or update modules 3130 can be provided by or with one or more other suitable systems, subsystems, servers, modules, elements, and/or models communicatively coupled to system 310 (e.g., via computer network 340). In another example, index pipeline 3100, data extraction module(s) 3110, message queues 3120, and/or update modules 3130 can be included in or combined with data source(s) 320 or shards 330.

In these or other embodiments, system 310, index pipeline 3100, data extraction module(s) 3110, message queues 3120, update modules 3130, and/or each of their respective elements, modules, and/or models can be implemented in hardware or combination of hardware and software. In many embodiments, the operator and/or administrator of system 300 or system 310 can manage system 310, index pipeline 3100, data extraction module(s) 3110, message queues 3120, update modules 3130, and/or their respective processor(s) and/or memory storage unit(s) using the respective input device(s) and/or display device(s).

In many embodiments, index pipeline 3100 can be configured to generate index messages for items (e.g., XML files, comma-separated value (CSV) files, PDF files, Microsoft Word files, etc.) from data source(s) 320 and cause the index messages to be stored in shards 330 so that the items can be searchable. Index pipeline 3100 can include one or more data extraction modules (e.g., data extraction module(s) 3110), one or more message queues (e.g., message queues 3120), and/or one or more update modules (e.g., update modules 3130). Examples of data extraction module(s) 3110 can include applications that use connectors to extract data from databases or file systems such as Apache Spark applications, Apache Hadoop applications, ETL applications, LogStash, etc. Examples of message queues 3120 with partition support can include Apache Kafka partitions, Amazon Kinesis index shards, Azure Event Hubs, Solace, etc. Update modules 3130 can be implemented by any suitable modules, models, Application Programming Interfaces (APIs), libraries, and so forth (e.g., Solr library, Elasticsearch update API, Couchbase update API, etc.).

In a number of embodiments, index pipeline 3100 or data extraction module(s) 3110 can retrieve the items stored in data source(s) 320, transform the items into index messages, and forward the index messages to message queues 3120 according to a common mapping scheme. After the index messages are stored in message queues 3120, index pipeline 3100 or update modules 3130 can periodically retrieve the index messages from message queues 3120 and causing the index messages to be committed to shards 330 according to the common mapping scheme in batches. In many embodiments, the common mapping scheme can define a mapping between each of message queues 3120 and a corresponding shard (e.g., shard 3301, shard 3302, or shard 330n) of shards 330. The common mapping scheme can include a respective shard hash range for each of shards 330 and a mapping function. The respective shard hash range corresponds to range of message hash values for the index messages to be stored in the corresponding shard (e.g., shard 3301, shard 3302, or shard 330n). In some embodiments, the common mapping scheme can be determined by system 300, system 310, or index pipeline 3100. In certain embodiments, the common mapping scheme can be predetermined and obtained by system 310 or index pipeline 3100 from a database, a remote data center, or a third-party system, etc.

Meanwhile, examples of the one or more data sources (e.g., data source(s) 320) can include one or more file systems and/or databases for storing items to be indexed, such as a database for storing customer profiles for an online retailer server, and/or a cloud storage that contains information about products, SKUs (stock keeping units), inventory, and/or online orders, for example, among other information. Examples of file systems can include APFS by Apple Inc., NTFS by Microsoft Corp., XFS by Silicon Graphics, Inc., NSS (Novell Storage Services), and ext4 (fourth extended filesystem), etc. In some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units. Further, the one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, RocksDB, and IBM DB2 Database.

In some embodiments, shards 330 can include a plurality of shards (e.g., shard 3301, shard 3302, and/or shard 330n, etc.) for storing search indexes for a collection of items split evenly or unevenly among the shards. Examples of shards 330 can include an Apache SolrCloud, Elasticsearch, Couchbase, Apache Cassandra, Mcrouter/Memcached, and so forth. Shard 3301, shard 3302, and/or shard 330n each can include one or more respective replicas. For a shard with multiple replicas, one of the shard can be selected as a shard leader configured to receive an index message and further send the index message to be stored at each of the rest of the replicas of the shard.

In many embodiments, system 310 can be in data communication, directly or through computer network 340, with data source(s) 320, shards 330, shard 3301, shard 3302, and/or shard 330n. Computer network 340 can include one or more of a computer network, a telephone network, the Internet, an internal network not open to the public (e.g., a private network and/or a virtual private network (VPN)), and/or any other suitable mechanisms for wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In a number of embodiments, system 310 further can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touchscreen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

In a number of embodiments, system 300 can include multiple data centers in different geographic areas. For example, in some embodiments with multiple data centers, system 300 can include: (a) data source(s) 320; (b) system 310 that includes: (i) data extraction module(s) 3110 and (ii) multiple groups of message queues 3120 and update modules 3130; (c) multiple groups of shards, each similar to shards 330; and (d) computer network 340. Each group of message queues 3120 and update modules 3130 in a data center can be associated with a corresponding group of shards 330 in the same geographic area. In similar or different embodiments, system 300 can include: (a) data source(s) 320; (b) system 310 that includes data extraction module(s) 3110, message queues 3120 and update modules 3130; (c) shards 330; (d) computer network 340; and (e) one or more duplicate data centers each comprising: (i) message queues 3120; (ii) update modules 3130; and (iii) shards 330.

In several embodiments with one or more duplicate data centers, system 310 can cause the common mapping scheme to be applied to the one or more duplicate data centers. Further, when an item is to be indexed for search, in addition to the activities discussed above, system 300, system 310, and/or index pipeline 3100 can transmit the index message, generated by data extraction module(s) 3110 and to be committed to shards 330, to each of the one or more duplicate data centers (e.g., message queues 3120 of each duplicate data center).

Turning ahead in the drawings, FIG. 4 illustrates a flow chart for a method for distributing index messages in an index pipeline, according to an embodiment. In many embodiments, method 400 can be implemented via execution of computing instructions on one or more processors. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3), system 310 (FIG. 3), index pipeline (FIG. 3), data extraction module(s) 3110 (FIG. 3), message queues 3120 (FIG. 3), and/or update modules 3130 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), index pipeline (FIG. 3), data extraction module(s) 3110 (FIG. 3), message queues 3120 (FIG. 3), and/or update modules 3130 (FIG. 3). The processor(s) can be similar or identical to the processor(s) described above with respect to computer system 100 (FIG. 1).

In many embodiments, method 400 can include a block 410 of determining a common mapping scheme for a plurality of message queues (e.g., message queues 3120 (FIG. 3)) and a plurality of shards (e.g., shards 330 (FIG. 3), shard 3301 (FIG. 3), shard 3302 (FIG. 3), and/or shard 330n (FIG. 3), etc.). The common mapping scheme can be used for reducing the delay or blocking of the updates for index messages by determining how the index messages are processed in an index pipeline (e.g., index pipeline 3100 (FIG. 3)), including: (a) which of the plurality of message queues the index messages can be assigned to, and (b) which of the plurality of shards the index message can be committed to. In many embodiments, the common mapping scheme can be re-determined when one or more message queues and/or shards are added, removed, or replaced.

In a number of embodiments, the common mapping scheme can include a respective shard hash range for each of the plurality of shards, and a mapping function between the plurality of message queues and the plurality of shards. In some embodiments, block 410 further can include a block 4110 of determining the mapping function. The mapping function can be used to determine an intermediate message queue and a target shard for an index message based on a message hash value for the index message and the respective shard hash range for each shard. In certain embodiments, block 410 does not include block 4110, and instead of the mapping function, the common mapping scheme can include a table predetermined based on the plurality of message queues, the plurality of shards, the sub-queue hash range for each sub-queue, and/or the sub-shard hash range for each sub-shard.

In many embodiments, the mapping function in block 4110 can be determined based on a virtual one-to-one mapping between virtual queues of the plurality of message queues and virtual shards of the plurality of shards. The virtual queues and virtual shards can be respective conceptual units for the message queues or shards that are created conceptually for determining the virtual mapping, and each can correspond to an entirety or a portion of a single message queue or shard respectively. The index pipeline, including the message queues, can be associated with a full range of message hash values for index messages to be processed in the index pipeline, and each message queue and each shard can be associated with a corresponding sub-range of the message hash values, respectively. For example, when a message hash value for an index message is an 8-digit hexadecimal number, the full range of message hash values can be 0x0000000-0xFFFFFFFF, and a sub-range of the message hash values for a specific message queue can be 0x20000000-0x28000000 or 0x00010000-0x0011FFFF, etc.

In many embodiments, a respective sub-range of message hash values for each message queue can be non-overlapping, and the combination of the respective sub-ranges of message hash values for all of the message queues can be the full range of message hash values (e.g., 0x0000000-0xFFFFFFFF). The respective sub-range of message hash values for each message queue can be divided evenly or assigned based on the characteristics (e.g., the size, the estimated throughput, etc.) of the message queues. In similar or different embodiments, a respective sub-range of message hash values for each shard also can be non-overlapping, and the combination of the respective sub-ranges of message hash values for all of the shards can be the full range of message hash values (e.g., 0x0000000-0xFFFFFFFF). The respective sub-range of message hash values for each shard also can be divided evenly (or as evenly as possible) or assigned based on the characteristics (e.g., the size, the estimated throughput, etc.) of the shards.

In a number of embodiments, block 4110 can include determining, based on a shard count ($C_S$) for the plurality of shards (e.g., shards 330 (FIG. 3), shard 3301 (FIG. 3), shard 3302 (FIG. 3), and/or shard 330n (FIG. 3)) and a queue count ($C_Q$) for the plurality of message queues (e.g., message queues 3120 (FIG. 3)), a sub-shard count ($C_{SS}$) for each of the plurality of shards. The sub-shard count can be a respective number of sub-shards (e.g., virtual shards or conceptual units) for each shard. In different or similar embodiments, each shard can include a different number of sub-shards. Moreover, the size of the sub-shard hash range for each sub-shard can be equal or different.

Block 4110 further can include determining, based on the shard count ($C_S$) and the queue count ($C_Q$), a sub-queue count ($C_{QS}$) for each of the plurality of message queues. The sub-queue count can be a respective number of sub-queues (e.g., virtual queues or conceptual units) in each message queue. In different or similar embodiments, each message queue can include a different number of sub-queues. In addition, the size of the sub-queue hash range for each sub-queue can be equal or different. For example, in an embodiment with 6 shards (e.g., shard #0, shard #1, shard #2, . . . and shard #5) and 16 message queues (e.g., queue #0, queue #1, . . . , and queue #15), to achieve the one-to-one mapping, the sub-shard count can be 8 per shard and the sub-queue count per message queue can be 3. As such, in total, there can be 48 virtual queues or sub queues mapped one-to-one to 48 virtual shards or sub shards.

In some embodiments, block 4110 additionally can include determining, based on the sub-shard count ($C_{SS}$), one or more respective sub-shard hash ranges ($R_{Sij}$) for the respective shard hash range ($R_{Si}$) for each of the plurality of shards. In many embodiments, the one or more respective sub-shard hash ranges ($R_{Sij}$) can be determined based on a function and/or a predetermined table. For example, in some embodiments, the respective shard hash range ($R_{Si}$) for each of the plurality of shards can be equal or substantially equal, and each of the one or more respective sub-shard hash ranges ($R_{Sij}$) for each sub-shard throughout the plurality of shards can be substantially equal to $R_{Si}/C_{SS}$. In different or similar embodiments, the respective shard hash range ($R_{Si}$) for each of the plurality of shards can be different, and each of the one or more respective sub-shard hash ranges ($R_{Sij}$) can be substantially the same in the same shard and different in different shards.

In a number of embodiments, block 4110 further can include determining, based on the sub-queue count ($C_{QS}$), one or more respective sub-queue hash ranges ($R_{Qij}$) for a respective queue hash range ($R_{Qi}$) for each of the plurality of message queues. In many embodiments, the one or more respective sub-queue hash ranges ($R_{Qij}$) can be determined based on a function and/or a predetermined table. For example, each of one or more respective sub-queue hash ranges ($R_{Qij}$) can be substantially equal for each sub-queue in the same message queue or in every message queue. In certain embodiments, each of the sub-queue can be mapped one-to-one to a corresponding sub-shard, and this activity can be skipped.

In a number of embodiments, block 4110 further can include determining a mapping function of the common mapping scheme. The mapping scheme can include a bijective function between: (a) each sub-shard of one or more respective sub-shards for each of the plurality of shards and (b) a mapped sub-queue of one or more respective sub-queues for each of the plurality of the message queues, based on a sub-shard hash range for the each sub-shard and a sub-queue hash range for the mapped sub-queue.

In many embodiments, the shard count (e.g., $C_S$) and the queue count (e.g., $C_Q$) can be identical or different. In a number of embodiments, the size of each sub-shard hash range for each sub-shard of each shard (e.g., size ($R_{Sij}$)) can be equal to the size of each sub-queue hash range for each sub-queue of each message queue (e.g., size ($R_{Qij}$)). In different or similar embodiments, the size of each sub-shard hash range for each sub-shard of each shard (e.g., size ($R_{Sij}$)) can be different from the size of each sub-queue hash range for each sub-queue of each message queue (e.g., size ($R_{Qij}$)).

Turning ahead in the drawings, FIG. 5 illustrates an exemplary method for determining a common mapping scheme with a mapping function, according to an embodiment. In many embodiments, method 500 can be implemented via execution of computing instructions on one or more processors. Method 500 is merely exemplary and is not limited to the embodiments presented herein. Method 500 can be employed in method 400 (FIG. 4), block 410 (FIG. 4), block 4110 (FIG. 4), and/or different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 500 can be performed in any suitable order. In still other embodiments, one or more of the procedures, the processes, the activities, and/or the blocks of method 500 can be combined or skipped.

In many embodiments, system 300 (FIG. 3), system 310 (FIG. 3), index pipeline (FIG. 3), data extraction module(s) 3110 (FIG. 3), message queues 3120 (FIG. 3), and/or update modules 3130 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), index pipeline (FIG. 3), data extraction module(s) 3110 (FIG. 3), message queues 3120 (FIG. 3), and/or update modules 3130 (FIG. 3). The processor(s) can be similar or identical to the processor(s) described above with respect to computer system 100 (FIG. 1).

In many embodiments, the common mapping scheme can include a respective shard hash range for each of the plurality of shards (e.g., shards 330 (FIG. 3), shard 3301 (FIG. 3), shard 3302 (FIG. 3), shard 330*n* (FIG. 3), etc.), and a mapping function between the plurality of message queues (e.g., message queues 3120 (FIG. 3)) and the plurality of shards. The mapping function further can include a bijective function between: (a) each sub-shard of one or more respective sub-shards for each of the plurality of shards and (b) a mapped sub-queue of one or more respective sub-queues for each of the plurality of the message queues, based on a sub-shard hash range for the each sub-shard and a sub-queue hash range for the mapped sub-queue.

In a number of embodiments, method 500 can include a block 510 of determining a least common multiple (LCM) of a shard count ($C_S$) and a queue count ($C_Q$). The LCM can be the total number of sub-shards for the plurality of shards, as well as the total number of sub-queues for the plurality of message queues, so that the sub-shards can be mapped one-to-one with the sub-queues, and vice versa.

In some embodiments, method 500 further can include a block 520 of determining a sub-shard count ($C_{SS}$) for each of the plurality of shards. In embodiments where each shard includes the same amount of sub-shards, block 520 can include a block 5210 of dividing the least common multiple (LCM) by the shard count ($C_S$) to determine the sub-shard count ($C_{SS}$) for each shard.

In a number of embodiments, method 500 further can include a block 530 of determining one or more respective sub-shard hash ranges (e.g., $R_{Sij}$, $0 \leq i < C_S$, $0 \leq j < C_{SS}$) for the respective shard hash range (e.g., $R_{Si}$, $0 \leq i < C_S$) for each of the plurality of shards. For example, the respective shard hash range ($R_{Sij}$) for the $j^{th}$ sub-shard of the $i^{th}$ shard ($S_i$, $0 \leq i < C_S$) of the plurality of shards can be $$R_{Si0} + \sum_{0}^{j-1} \text{size}(R_{S_{ia}}).$$

$R_{Si0}$ can be the sub-shard hash range for the first sub-shard (j=0) of the $i^{th}$ shard, and the size of $R_{Sij}$ (e.g., size ($R_{Sij}$)) can be (size ($R_{Si}$) mod $C_{SS}$)+1*$Y_{ij}$, wherein $R_{Si}$ is the total range of the message hash values for the $i^{th}$ shard; and wherein $Y_{ij}=1$, when (size $(R_{Si})$ % $C_{SS}) \geq j+1$, otherwise, $Y_{ij}=0$. Further, size $(R_{Si})$ can be (size $(R_S)$ mod $C_S)+1*Z_i$, wherein $R_S$ is the total range of the message hash values (e.g., 0x0000000-0xFFFFFFFF) for the plurality of shards; and wherein $Z_i=1$, when (size $(R_S)$ % $C_S) \geq i+1$, otherwise, $Z_i=0$. Accordingly, the shard hash range $(R_{Si})$ of a shard $(S_i)$ of the plurality of shards can be $$R_{S0} + \sum_{0}^{i-1} \text{Size}(R_{S_i}).$$

For example, when $C_S=6$, $C_{SS}=8$, and $R_S=0x00000000$-0xFFFFFFFF:
- size $(R_S)$ mod $C_S=0x2AAAAAAA$;
- size $(R_S)$ % $C_S=4$;
- $Z_0=1$, because $4 \geq 0+1$;
- size $(R_{S0})=0x2AAAAAAA+1=0x2AAAAAAB$;
- $R_{S0}=0x00000000-0x2AAAAAAA$;
- size $(R_{S0})$ mod $C_{SS}=0x05555555$;
- size $(R_{S0})$ % $C_{SS}=3$;
- $Y_{00}=1$, because $3 \geq 0+1$;
- size $(R_{S00})=0x05555556$;
- $R_S00=0x00000000-0x05555555$;
- $R_S01=R_{S00}+\text{size}$ $(R_{S00})=0x05555556-0x0AAAAAAB$;

$$R_{Sij} = R_{Si0} + \sum_{0}^{j-1} \text{size}(R_{Sia}) = R_{S00} + \sum_{0}^{i-1} \text{size}(R_{Sb}) + \sum_{0}^{j-1} \text{size}(R_{Sia}); \ldots$$

and so forth.

In similar or different embodiments, size $(R_{Sij})$ can instead be (size $(R_{Si})$ mod $C_{SS})+1*Y_{ij}$, wherein $R_{Si}$ is the total range of the message hash values for the $i^{th}$ shard; and wherein $Y_{ij}=1$, when $C_{SS}-(\text{size } (R_{Si}) \% C_{SS}) \leq j$, otherwise, $Y_{ij}=0$. In several embodiments, size $(R_{Si})$ can be (size $(R_S)$ mod $C_S)+1*Z_i$, wherein $R_S$ is the total range of the message hash values for the plurality of shards; and wherein $Z_i=1$, when $C_S-(\text{size } (R_S) \% C_S) \leq i$, otherwise, $Z_i=0$.

In a number of embodiments, method 500 further can include a block 540 of determining a sub-queue count $(C_{QS})$ for each of the plurality of message queues. In embodiments where each message queue includes the same amount of sub-queues, block 540 can include a block 5410 of dividing the least common multiple (LCM) by the queue count $(C_Q)$ to determine the sub-queue count $(C_{QS})$.

In a number of embodiments, method 500 further can include a block 550 of determining one or more respective sub-queue hash ranges (e.g., $R_{Qij}$, $0 \leq i < C_Q$, $0 \leq j < C_{QS}$) for a respective queue hash range (e.g., $R_{Qi}$, $0 \leq i < C_Q$) for each of the plurality of message queues. For example, the respective queue hash range $(R_{Qij})$ for the $j^{th}$ sub-queue of the $i^{th}$ message queue $(Q_i, 0 \leq i < C_Q)$ of the plurality of message queues can be $$R_{Qi0} + \sum_{0}^{j-1} \text{size}(R_{Qia}).$$

$R_{Qi0}$ can be the sub-queue hash range for the first sub-queue (j=0) of the $i^{th}$ message queue. The size of $R_{Qij}$ (size $(R_{Qij})$) can be (size $(R_{Qi})$ mod $C_{QS})+1*Y_{ij}$, wherein $R_{Qi}$ is the total range of the message hash values for the $i^{th}$ message queue; and wherein $Y_{ij}=1$, when (size $(R_{Qi})$ % $C_{QS}) \geq j+1$, otherwise, $Y_{ij}=0$. Further, size $(R_{Qi})$ can be (size $(R_Q)$ mod $C_Q)+1*Z_i$, wherein $R_Q$ is the total range of the message hash values for the plurality of message queues; and wherein $Z_i=1$, when (size $(R_Q)$ % $C_Q) \geq i+1$, otherwise, $Z_i=0$.

For example, when $C_Q=16$, $C_{QS}=3$, and $R_Q=0x00000000$-0xFFFFFFFF:
- size $(R_Q)$ mod $C_Q=0x10000000$;
- size $(R_Q)$ % $C_Q=0$;
- $Z_0=0$, because $0 < 0+1$;
- size $(R_{Q0})=0x10000000+1=0x10000001$;
- $R_{Q0}=0x00000000-0x10000000$;
- size $(R_{Q0})$ mod $C_{QS}=0x05555555$;
- size $(R_{Q0})$ % $C_{QS}=2$;
- $Y_{00}=1$, because $2 \geq 0+1$;
- size $(R_{Q00})=0x05555555+1=0x05555556$;
- $R_{Q00}=0x00000000-0x05555556$;
- $R_{Q01}=R_{Q00}+\text{size}$ $(R_{Q00})=0x05555556-0x0AAAAA$ AB; . . .

$$R_{Qij} = R_{Qi0} + \sum_{0}^{j-1} \text{size}(R_{Qia}) = R_{Q00} + \sum_{0}^{i-1} \text{size}(R_{Qb}) + \sum_{0}^{j-1} \text{size}(R_{Qia});$$

. . .

and so forth.

In similar or different embodiments, size $(R_{Qij})$ can instead be $(R_{Qi}$ mod $C_{QS})+1*Y_{ij}$, wherein $R_{Qi}$ is the total range of the message hash values for the $i^{th}$ message queue; and wherein $Y_{ij}=1$, when $C_{QS}-(R_{Qi} \% C_{QS}) \leq j$, otherwise, $Y_{ij}=0$. Further, in some embodiments, size $(R_{Qi})$ can be (size $(R_Q)$ mod $C_Q)+1*Z_i$, wherein $R_Q$ is the total range of the message hash values for the plurality of message queues; and wherein $Z_i=1$, when (size $(R_Q)$ % $C_Q) \geq i+1$, otherwise, $Z_i=0$.

In yet another similar or different embodiment, block 550 can determine the one or more respective sub-queue hash ranges (e.g., $R_{Qij}$, $0 \leq i < C_Q$, $0 \leq j < C_{QS}$) for a respective queue hash range (e.g., $R_{Qi}$, $0 \leq i < C_Q$) for each of the plurality of message queues by matching the sub-queues to the sub-shards based on their respective sequence numbers. For example, in embodiments where block 550 is performed after each of the one or more respective sub-queue hash ranges $(R_{Sxy})$ is determined in block 530, each of the one or more respective sub-queue hash ranges $(R_{Qij})$ can be equal to $R_{Sxy}$, when $i*C_{QS}+j=x*C_{SS}+y$.

In a number of embodiments, method 500 further can include a block 560 of determining a bijective function between: (a) each sub-shard $(S_{ij}, 0 \leq i < C_S, 0 \leq j < C_{SS})$ and (b) a mapped sub-queue $(Q_{xy}, 0 \leq x < C_Q, 0 \leq y < C_{QS})$, based on a sub-shard hash range $(R_{Sij})$ for the each sub-shard and a sub-queue hash range $(R_{Qxy})$ for the mapped sub-queue. In many embodiments, the bijective function can pair a sub-shard (e.g., $S_{ij}$) with a single corresponding sub-queue (e.g., $Q_{xy}$), and vice versa, when $R_{Sij}=R_{Qxy}$.

In several embodiments, method 500 further can include storing a table comprising each sub-shard hash range (e.g., $R_{Sij}$), as determined in block 530, and each sub-queue hash range (e.g., $R_{Qxy}$), as determined in block 550, to a memory device (e.g., memory storage unit 208 (FIG. 1)) and/or a database. Method 500 and/or the bijective function, as determined in block 560, also can include retrieving the table from the memory device and/or database and looking the table up for the mapped sub-shard and sub-queue. In different or similar embodiments, method 500 can perform blocks 510, 520, 530, 540, 550, and/or 560 in real-time before the mapping function is to be used.

Turning ahead in the drawings, FIG. 6 illustrates an exemplary table 600 of a common mapping scheme, according to an embodiment. Table 600 is merely exemplary and is not limited to the embodiments presented herein. Table 600 can be employed in many different embodiments or examples not specifically depicted or described herein. In many embodiments, system 300 (FIG. 3), system 310 (FIG. 3), index pipeline (FIG. 3), data extraction module(s) 3110 (FIG. 3), message queues 3120 (FIG. 3), update modules 3130 (FIG. 3), method 400 (FIG. 4), block 410 (FIG. 4), and/or method 500 (FIG. 5) can be suitable to determine table 600.

In many embodiments, table 600 can include a respective shard hash range for each of the plurality of shards (e.g., shards 330 (FIG. 3), shard 3301 (FIG. 3), shard 3302 (FIG. 3), shard 330*n* (FIG. 3), or the 10 shards in table 600, etc.). Each shard in table 600 further can include multiple sub-shards for each shard and a sub-shard hash range for each sub-shard. A virtual one-to-one mapping between the sub-shards and the sub-queues can be found in table 600. In embodiments shown in FIG. 6, the sub-shard hash range for a sub-shard can be equal to the sub-queue hash range for a single corresponding sub-queue for a message queue of the plurality of message queues (e.g., the 15 message queues in table 600). For example, sub-shard #10 in table 600 is associated with the sub-shard hash range, 0xD5545555-0xDDDCAAA9, which is further associated with sub-queue #10. Further, the total sub-shard count for the sub-shards in table 600 is equal to the total sub-queue count for the sub-queues in table 600, which is the least common multiple (LCM) (e.g., 30 in table 600) of the total shard count and the total queue count. Moreover, the range size of the sub-shard hash range for each sub-shard for a shard in table 600 can be substantially the same (e.g., 0x08885555 for sub-shard #0 and 0x08885556 for sub-shard #s 1-2). The range size of the sub-shard hash range for a sub-shard for a first shard can be the same (or substantially the same) or different from the range size of the sub-shard hash range for a sub-shard for a second shard. For example, in table 600, the range size of the sub-shard hash range for sub-shard #0 is 0x08885555 for sub-shard #0, and the range size of the sub-shard hash range for sub-shard #9 is 0x0888AAAA.

In different or similar embodiments, the total sub-shard count and the total sub-queue count can be a multiple of the LCM instead (e.g., 2*LCM, 3*LCM, etc.). In yet other embodiments, the total sub-shard count and the total sub-queue count can be an integer that is not the least common multiple. The sub-shard count can be different from one shard to another, and/or the sub-queue count can be different from one message queue to another. The respective shard hash range and/or sub-shard count for each shard and/or the respective queue hash range and/or sub-queue count for each message queue can be determined based on the characteristics of the index pipeline, the message queues and/or shards. In embodiments where each shard is not equal, a shard that is expected or known to be slower in processing read and/or write commands than others can be assigned a narrower shard hash range than the faster shard(s). For example, in table 600, shard #0 is associated with a narrower shard hash range (e.g., 0x19990000) than shard #1 (e.g., 0x199A0000).

Referring back to FIG. 4, in many embodiments, method 400 further can include a block 420 of generating an index message for an item in a data source (e.g., data source(s) 320 (FIG. 3)). Block 420 can be performed by an index pipeline (e.g., index pipeline 3100 (FIG. 3)) or a data extraction module (e.g., data extraction module(s) 3110 (FIG. 3)) to transform the item into the index message of a different format so that the item can be searchable.

In many embodiments, method 400 further can include a block 430 of determining a message hash value for an index message. In a number of embodiments, the message hash value can be determined based on a unique identifier (e.g., a document identifier) of the item (e.g., a document in a file system) or the index message generated by a data extraction module for the item (e.g., data extraction module(s) 3110 (FIG. 3)).

In a number of embodiments, method 400 further can include a block 440 of determining a target shard of the plurality of shards (e.g., shards 330 (FIG. 3), shard 3301 (FIG. 3), shard 3302 (FIG. 3), shard 330*n* (FIG. 3), etc.) based on the message hash value and the respective shard hash range for each of the plurality of shards. In many embodiments, the respective shard hash range for each of the plurality of shards can be determined based on the common mapping scheme, as determined in block 410 and/or method 500 (FIG. 5).

In a number of embodiments, method 400 further can include a block 450 of determining an intermediate message queue of the plurality of message queues (e.g., message queues 3120 (FIG. 3)) based on the message hash value and the mapping function for the target shard. In many embodiments, the respective queue hash range for each of the plurality of message queues can be determined based on the common mapping scheme, as determined in block 410 and/or method 500 (FIG. 5).

In a number of embodiments, method 400 further can include a block 460 of storing the index message to the intermediate message queue (e.g., message queues 3120 (FIG. 3)), as determined in block 450. In many embodiments, block 460 can be performed by system 300 (FIG. 3), system 310 (FIG. 3), index pipeline 3100 (FIG. 3), and/or data extraction module 3110 (FIG. 3)).

In a number of embodiments, method 400 further can include a block 470 of causing the index message stored in the intermediate message queue to be committed to the target shard, as determined in block 440. In many embodiments, block 470 can be performed by system 300 (FIG. 3), system 310 (FIG. 3), index pipeline 3100 (FIG. 3), and/or update module 3130 (FIG. 3)). Further, multiple index messages can be processed in a batch periodically (e.g., every 30 minutes, every hour, etc.) in block 470 so that the index messages stored in the intermediate message queue can be committed to the target shard at the same time.

In embodiments where index messages are to be backed up in one or more duplicate data centers, method 400 further can include transmitting the index message to be committed to the one or more duplicate data centers. Block 460 further can include storing the index message to the respective intermediate message queue in each duplicate data center. Block 470 also can include causing the index message stored in the intermediate message queue in block 460 to be committed to the target shard in the duplicate data center.

Jumping ahead in the drawings, FIG. 7 illustrates a method 700 for causing an index message stored in an intermediate message queue to be committed to a target shard, according to an embodiment. In many embodiments, method 700 can be implemented via execution of computing instructions on one or more processors. Method 700 is merely exemplary and is not limited to the embodiments presented herein. Method 700 can be employed in method 400 (FIG. 4), block 470 (FIG. 4), and/or different embodiments or examples not specifically depicted or described herein. In some embodiments, the procedures, the processes, the activities, and/or the blocks of method 700 can be performed in the order presented. In other embodiments, the procedures, the processes, the activities, and/or the blocks of method 700 can be performed in any suitable order. In still other embodiments, one or more of the procedures, the processes, the activities, and/or the blocks of method 700 can be combined or skipped.

In many embodiments, system 300 (FIG. 3), system 310 (FIG. 3), index pipeline (FIG. 3), and/or update modules 3130 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), index pipeline (FIG. 3), and/or update modules 3130 (FIG. 3). The processor(s) can be similar or identical to the processor(s) described above with respect to computer system 100 (FIG. 1).

In many embodiments, method 700 can include a block of 710 of determining one of the plurality of update modules (e.g., update modules 3130 (FIG. 3)) associated with the intermediate message queue based on a queue count ($C_Q$) for a plurality of message queues (e.g., message queues 3120 (FIG. 3)) and a updater count ($C_U$) for a plurality of update modules. In some embodiments, the update count ($C_U$) can be equal to, or be a multiple of, the queue count ($C_Q$) so that each update module can be associated with a separate set of one or more message queues. For example, an embodiment with 10 message queues (e.g., message queues #s 0-9) can include 10 update modules (e.g., update module #s 0-9) each associated with a single message queue (e.g., update module #5 being associated with message queue #5, etc.). Another embodiment can include 10 message queues (e.g., message queues #s 0-9) and 5 update modules (e.g., update modules #s 0-4), and each update module can be configured to process index messages in 2 associated message queues (e.g., update module #0 being associated with message queue #s 0-1, etc.). In different or similar embodiments, the update modules and the message queues can be matched in any other suitable manners (e.g., update module #s 0-1 each being associated with 2 message queues and update module #s 2-4 each being associated with one message queue, etc.).

In a number of embodiments, method 700 further can include a block 720 of causing the one of the plurality of update modules, determined in block 710, to: (a) read, from the intermediate message queue, one or more queued index messages, and (b) commit the batch of the one or more queued index messages, as read at (a), to the target shard(s) associated with the one or more queued index messages. In many embodiments, the target shard for each of the one or more queued index messages can be determined based on the common mapping scheme, determined in method 400 (FIG. 4), block 410 (FIG. 4), method 500 (FIG. 5), and/or table 600 (FIG. 6).

Various embodiments can include a system for distributing index messages in an index pipeline. The system can include one or more processors and one or more non-transitory computer-readable media storing computing instructions that, when run on the one or more processors, cause the one or more processors to perform one or more acts. The acts can include determining a common mapping scheme for a plurality of message queues and a plurality of shards for an index message to be committed to the plurality of shards. The common mapping scheme can include a respective shard hash range for each of the plurality of shards, and a mapping function between the plurality of message queues and the plurality of shards.

In a number of embodiments, determining a common mapping scheme can include determining the mapping function. The act of determining the mapping function further can include: (a) determining, based on a shard count for the plurality of shards and a queue count for the plurality of message queues, a sub-shard count for each of the plurality of shards; (b) determining, based on the shard count and the queue count, a sub-queue count for each of the plurality of message queues; (c) determining, based on the sub-shard count, one or more respective sub-shard hash ranges for the respective shard hash range for each of the plurality of shards; (d) determining, based on the sub-queue count, one or more respective sub-queue hash ranges for a respective queue hash range for each of the plurality of message queues; and (e) determining a bijective function between: (a) each sub-shard of one or more respective sub-shards for each of the plurality of shards and (b) a mapped sub-queue of one or more respective sub-queues for each of the plurality of the message queues, based on a sub-shard hash range for the each sub-shard and a sub-queue hash range for the mapped sub-queue. The mapping function can include the bijective function.

In some embodiments, the shard count and the queue count can be different. A first range size of each of the one or more respective sub-shard hash ranges can be equal to a second range size of each of the one or more respective sub-queue hash ranges. In several embodiments, determining the mapping function further can include: (a) determining a least common multiple of the shard count and the queue count; (b) determining the sub-shard count for each of the plurality of shards comprises dividing the least common multiple by the shard count; and (c) determining the sub-queue count for each of the plurality of message queues comprises dividing the least common multiple by the queue count.

In many embodiments, the acts further can include determining a message hash value for the index message. In certain embodiments, before determining the message hash value, the acts also can include generating the index message for an item in a data source. In a number of embodiments, after the message hash value is determined, the acts further can include determining a target shard of the plurality of shards based on the message hash value and the respective shard hash range for each of the plurality of shards.

In some embodiments, the acts further can include determining an intermediate message queue of the plurality of message queues based on the message hash value and the mapping function for the target shard. The acts additionally can include storing the index message to the intermediate message queue, as determined. In many embodiments, the acts further can include causing the index message stored in the intermediate message queue to be committed to the target shard.

In a number of embodiments, the act of causing the index message stored in the intermediate message queue to be committed to the target shard can include causing one of a plurality of update modules to: (a) read, from the intermediate message queue, a batch of one or more queued messages comprising the index message, and (b) commit the batch of the one or more queued messages, as read, to one or more of the plurality of shards comprising the target shard. The act of causing the index message stored in the intermediate message queue to be committed to the target shard further can include determining the one of the plurality of update modules based on a queue count for the plurality of message queues and a updater count for the plurality of update modules.

In several embodiments, the acts also can include causing the common mapping scheme to be applied to a duplicate data center. In embodiments with the duplicate data center, the act of storing the index message to the intermediate message queue further can include transmitting the index message to be committed to the duplicate data center.

Various embodiments further can include a method for distributing index messages in an index pipeline. The method can be implemented via execution of computing instructions configured to run at one or more processors and stored at one or more non-transitory computer-readable media. In many embodiments, the method can include determining a common mapping scheme for a plurality of message queues and a plurality of shards for an index message to be committed to the plurality of shards. The common mapping scheme can include a respective shard hash range for each of the plurality of shards, and a mapping function between the plurality of message queues and the plurality of shards.

In a number of embodiments, the method further can include determining a message hash value for the index message. The method further can include determining a target shard of the plurality of shards based on the message hash value and the respective shard hash range for each of the plurality of shards. In some embodiments, the method also can include determining an intermediate message queue of the plurality of message queues based on the message hash value and the mapping function for the target shard.

In many embodiments, the method further can include storing the index message to the intermediate message queue, as determined. In some embodiments, the method additionally can include causing the index message stored in the intermediate message queue to be committed to the target shard.

In a number of embodiments, determining the common mapping scheme can include determining the mapping function. Determining the mapping function can include: (a) determining, based on a shard count for the plurality of shards and a queue count for the plurality of message queues, a sub-shard count for each of the plurality of shards; (b) determining, based on the shard count and the queue count, a sub-queue count for each of the plurality of message queues; (c) determining, based on the sub-shard count, one or more respective sub-shard hash ranges for the respective shard hash range for each of the plurality of shards; (d) determining, based on the sub-queue count, one or more respective sub-queue hash ranges for a respective queue hash range for each of the plurality of message queues; and (e) determining a bijective function between: (i) each sub-shard of one or more respective sub-shards for each of the plurality of shards and (ii) a mapped sub-queue of one or more respective sub-queues for each of the plurality of the message queues, based on a sub-shard hash range for the each sub-shard and a sub-queue hash range for the mapped sub-queue. The mapping function can include the bijective function.

In many embodiments, the shard count and the queue count can be different. A first range size of each of the one or more respective sub-shard hash ranges can be equal to a second range size of each of the one or more respective sub-queue hash ranges. In a number of embodiments, determining the mapping function further can include determining a least common multiple of the shard count and the queue count. Determining the sub-shard count for each of the plurality of shards can include dividing the least common multiple by the shard count. Determining the sub-queue count for each of the plurality of message queues can include dividing the least common multiple by the queue count. In some embodiments, the method further can include before determining the message hash value for the index message, generating the index message for an item in a data source.

In many embodiments, causing the index message stored in the intermediate message queue to be committed to the target shard can include causing one of a plurality of update modules to: (a) read, from the intermediate message queue, a batch of one or more queued messages comprising the index message, and (b) commit the batch of the one or more queued messages, as read at (a), to one or more of the plurality of shards comprising the target shard. Causing the index message stored in the intermediate message queue to be committed to the target shard further can include determining the one of the plurality of update modules based on a queue count for the plurality of message queues and a updater count for the plurality of update modules.

In a number of embodiments, the method further can include causing the common mapping scheme to be applied to a duplicate data center. Storing the index message to the intermediate message queue further can include transmitting the index message to be committed to the duplicate data center.

In many embodiments, the techniques described herein can provide a practical application and several technological improvements. The techniques described herein can provide improvements to the data distribution technologies for a search engine, using a simplified approach to distribute index messages in an index pipeline to improve performance for storing and accessing indexed data in a partitioned data storage scheme. This approach thus can avoid delays caused by a slow shard in a conventional partitioned data storage system when multiple updaters need to access or update the same slow shard and improve the overall performance of the system. These techniques described herein can provide a significant improvement over conventional approaches that distribute index messages in message queues of an index pipeline randomly and update the shards of a sharded cluster in parallel.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although distributing index messages in a shard-aware index pipeline has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. Different mapping schemes, mapping functions, message pipelines, and/or distributed storage technologies may be used to map the index messages to shards.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to, when run on the one or more processors, cause the one or more processors to perform:
determining a common mapping scheme for a plurality of message queues and a plurality of shards for an index message to be committed to the plurality of shards, wherein:
the common mapping scheme comprises:
a respective shard hash range for each of the plurality of shards; and
a mapping function between the plurality of message queues and the plurality of shards;
determining a message hash value for the index message;
determining a target shard of the plurality of shards based on the message hash value and the respective shard hash range for each of the plurality of shards;
determining an intermediate message queue of the plurality of message queues based on the message hash value and the mapping function for the target shard;
storing the index message to the intermediate message queue, as determined; and
causing the index message stored in the intermediate message queue to be committed to the target shard.

2. The system in claim 1, wherein:
determining the common mapping scheme comprises determining the mapping function; and
determining the mapping function comprises:
determining, based on a shard count for the plurality of shards and a queue count for the plurality of message queues, a sub-shard count for each of the plurality of shards;
determining, based on the shard count and the queue count, a sub-queue count for each of the plurality of message queues;
determining, based on the sub-shard count, one or more respective sub-shard hash ranges for the respective shard hash range for each of the plurality of shards;
determining, based on the sub-queue count, one or more respective sub-queue hash ranges for a respective queue hash range for each of the plurality of message queues; and
determining a bijective function between: (a) each sub-shard of one or more respective sub-shards for each of the plurality of shards and (b) a mapped sub-queue of one or more respective sub-queues for each of the plurality of the message queues, based on a sub-shard hash range for the each sub-shard and a sub-queue hash range for the mapped sub-queue, wherein:
the mapping function comprises the bijective function.

3. The system in claim 2, wherein the shard count and the queue count are different.

4. The system in claim 2, wherein a first range size of each of the one or more respective sub-shard hash ranges is equal to a second range size of each of the one or more respective sub-queue hash ranges.

5. The system in claim 2, wherein:
determining the mapping function further comprises determining a least common multiple of the shard count and the queue count;
determining the sub-shard count for each of the plurality of shards comprises dividing the least common multiple by the shard count; and
determining the sub-queue count for each of the plurality of message queues comprises dividing the least common multiple by the queue count.

6. The system in claim 1, wherein the computing instructions are further configured, when run on the one or more processors, to cause the one or more processors to perform:
before determining the message hash value for the index message, generating the index message for an item in a data source.

7. The system in claim 1, wherein:
causing the index message stored in the intermediate message queue to be committed to the target shard comprises causing one of a plurality of update modules to: (a) read, from the intermediate message queue, a batch of one or more queued messages comprising the index message, and (b) commit the batch of the one or more queued messages, as read, to one or more of the plurality of shards comprising the target shard.

8. The system in claim 7, wherein:
causing the index message stored in the intermediate message queue to be committed to the target shard further comprises determining the one of the plurality of update modules based on a queue count for the plurality of message queues and a updater count for the plurality of update modules.

9. The system in claim 1, wherein the computing instructions are further configured, when run on the one or more processors, to cause the one or more processors to perform:
causing the common mapping scheme to be applied to a duplicate data center.

10. The system in claim 9, wherein:
storing the index message to the intermediate message queue further comprises transmitting the index message to be committed to the duplicate data center.

11. A method being implemented via execution of computing instructions configured to run at one or more processors and stored at one or more non-transitory computer-readable media, the method comprising:
determining a common mapping scheme for a plurality of message queues and a plurality of shards for an index message to be committed to the plurality of shards, wherein:
the common mapping scheme comprises:
a respective shard hash range for each of the plurality of shards; and
a mapping function between the plurality of message queues and the plurality of shards;

determining a message hash value for the index message;
determining a target shard of the plurality of shards based on the message hash value and the respective shard hash range for each of the plurality of shards;
determining an intermediate message queue of the plurality of message queues based on the message hash value and the mapping function for the target shard;
storing the index message to the intermediate message queue, as determined; and
causing the index message stored in the intermediate message queue to be committed to the target shard.

12. The method in claim 11, wherein:
determining the common mapping scheme comprises determining the mapping function; and
determining the mapping function comprises:
    determining, based on a shard count for the plurality of shards and a queue count for the plurality of message queues, a sub-shard count for each of the plurality of shards;
    determining, based on the shard count and the queue count, a sub-queue count for each of the plurality of message queues;
    determining, based on the sub-shard count, one or more respective sub-shard hash ranges for the respective shard hash range for each of the plurality of shards;
    determining, based on the sub-queue count, one or more respective sub-queue hash ranges for a respective queue hash range for each of the plurality of message queues; and
    determining a bijective function between: (a) each sub-shard of one or more respective sub-shards for each of the plurality of shards and (b) a mapped sub-queue of one or more respective sub-queues for each of the plurality of the message queues, based on a sub-shard hash range for the each sub-shard and a sub-queue hash range for the mapped sub-queue, wherein:
        the mapping function comprises the bijective function.

13. The method in claim 12, wherein the shard count and the queue count are different.

14. The method in claim 12, wherein a first range size of each of the one or more respective sub-shard hash ranges is equal to a second range size of each of the one or more respective sub-queue hash ranges.

15. The method in claim 12, wherein:
determining the mapping function further comprises determining a least common multiple of the shard count and the queue count;
determining the sub-shard count for each of the plurality of shards comprises dividing the least common multiple by the shard count; and
determining the sub-queue count for each of the plurality of message queues comprises dividing the least common multiple by the queue count.

16. The method in claim 11, further comprising at least one of:
before determining the message hash value for the index message, generating the index message for an item in a data source; or
causing the common mapping scheme to be applied to a duplicate data center, wherein storing the index message to the intermediate message queue further comprises transmitting the index message to be committed to the duplicate data center.

17. The method in claim 11, wherein:
causing the index message stored in the intermediate message queue to be committed to the target shard comprises causing one of a plurality of update modules to: (a) read, from the intermediate message queue, a batch of one or more queued messages comprising the index message, and (b) commit the batch of the one or more queued messages, as read, to one or more of the plurality of shards comprising the target shard.

18. The method in claim 17, wherein:
causing the index message stored in the intermediate message queue to be committed to the target shard further comprises determining the one of the plurality of update modules based on a queue count for the plurality of message queues and a updater count for the plurality of update modules.

19. A non-transitory computer-readable media storing computing instructions that, when executed by one or more processors, cause the one or more processors to perform operations comprising:
determining a common mapping scheme for a plurality of message queues and a plurality of shards for an index message to be committed to the plurality of shards, wherein:
    the common mapping scheme comprises:
        a respective shard hash range for each of the plurality of shards; and
        a mapping function between the plurality of message queues and the plurality of shards;
determining a message hash value for the index message;
determining a target shard of the plurality of shards based on the message hash value and the respective shard hash range for each of the plurality of shards;
determining an intermediate message queue of the plurality of message queues based on the message hash value and the mapping function for the target shard;
storing the index message to the intermediate message queue, as determined; and
causing the index message stored in the intermediate message queue to be committed to the target shard.

20. The non-transitory computer-readable media of claim 19, wherein:
determining the common mapping scheme comprises determining the mapping function; and
determining the mapping function comprises:
    determining, based on a shard count for the plurality of shards and a queue count for the plurality of message queues, a sub-shard count for each of the plurality of shards;
    determining, based on the shard count and the queue count, a sub-queue count for each of the plurality of message queues;
    determining, based on the sub-shard count, one or more respective sub-shard hash ranges for the respective shard hash range for each of the plurality of shards;
    determining, based on the sub-queue count, one or more respective sub-queue hash ranges for a respective queue hash range for each of the plurality of message queues; and determining a bijective function between: (a) each sub-shard of one or more respective sub-shards for each of the plurality of shards and (b) a mapped sub-queue of one or more respective sub-queues for each of the plurality of the message queues, based on a sub-shard hash range for the each sub-shard and a sub-queue hash range for the mapped sub-queue, wherein:

the mapping function comprises the bijective function.

* * * * *